Aug. 17, 1965 B. L. COSBY 3,201,600

TRANSISTOR SWITCHING CIRCUIT WITH MEANS TO NEUTRALIZE MINORITY CARRIER STORAGE

Filed Sept. 19, 1961

INVENTOR
BADEN L. COSBY

BY William E. Cleaver
ATTORNEY

United States Patent Office 3,201,600
Patented Aug. 17, 1965

3,201,600

TRANSISTOR SWITCHING CIRCUIT WITH MEANS TO NEUTRALIZE MINORITY CARRIER STORAGE

Baden L. Cosby, Penn Square Village, Norristown, Pa., assignor to Sperry Rand Corporation, New York, N.Y., a corporation of Delaware Filed Sept. 19, 1961, Ser. No. 139,199
8 Claims. (Cl. 307—88.5)

Figure 1:
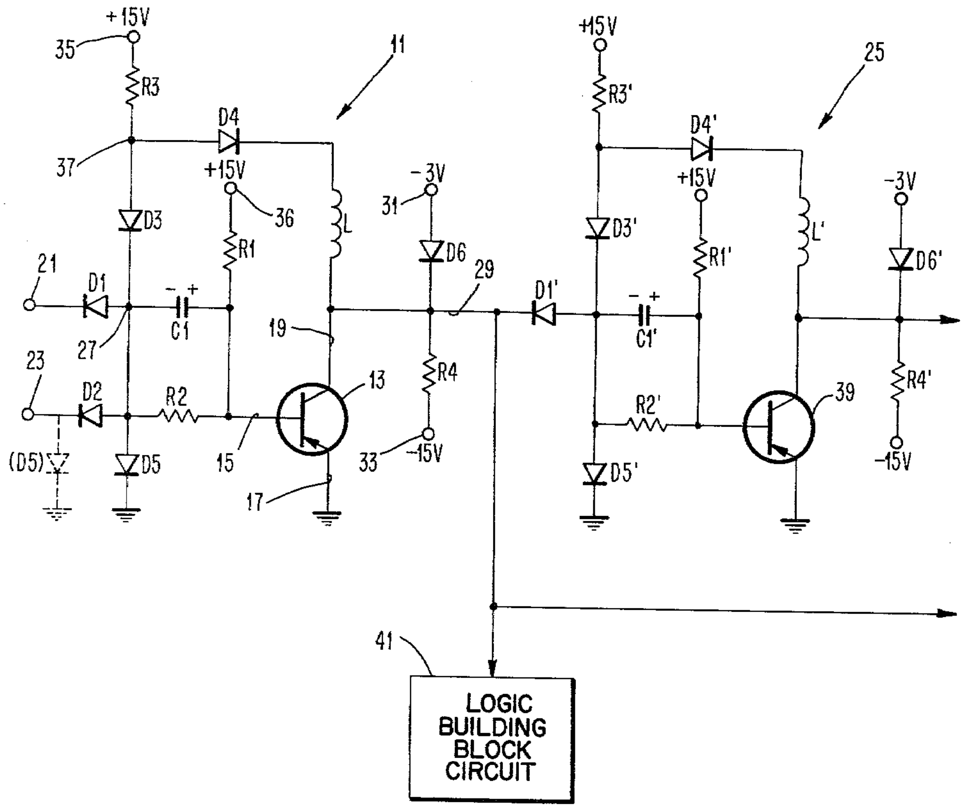

This invention relates to switching circuits and more particularly to a logic building-block circuit which provides high speed switching.

It has been recognized that the speed with which a common-emitter connected transistor is turned on is proportional to the current which flows across the base-emitter junction in response to an applied "turn-on" voltage. It has been further recognized that when such a transistor is conducting it does not "turn-off" at the instant that the applied voltage is terminated. The reason for the delay in "turn-off" is that the stored minority carriers continue to provide collector current until they have been dissipated, or neutralized.

In order to reduce the delay in turn-off time, circuits have been provided to reverse the conducting bias across the base-emitter junction of the transistor. In this way current flows into the base element in the opposite direction from that in which it had been flowing and the minority carriers are neutralized. The neutralization of the minority carriers terminates the current flow in the collector and hence the speed with which these stored carriers are neutralized determines how rapidly the transistor is turned off (i.e. how rapidly collector current ceases to flow). In order to accomplish a high-speed "turn-off" it has been the practice to provide a battery connected to the base which reverses the bias across the base-emitter junction when the applied "turn-on" voltage is terminated. While such an arrangement has merit for increasing the speed of "turn-off" is does limit the base-emitter current which flows in response to an applied "turn-on" signal because part of the current which flows in the base element is supplied by the battery. Hence the speed at which the transistor is turned on becomes limited by the provision of a means (i.e. the battery) to speed up the "turn-off."

Accordingly, it is an object of the present invention to provide an improved high speed switching circuit.

It is a further object of the present invention to provide a logic building block circuit which includes a means to rapidly turn the transistor off but which does not burden the circuit by this means at the time that the transistor is being turned on.

It is a further object of the present invention to provide a logic building-block circuit which delays steering the "turn-off" current to the output thereof thereby continuing the neutralization effect on the minority carriers in the first stage and further enabling a succeeding stage to effect a high speed "turn-on."

In accordance with a feature of the present invention there is provided a current steering circuit which steers current into the base element immediately after the time that the transistor is turned on and thereby provides current to neutralize the minority carriers at the time that the transistor is being turned off. This current steering circuit operates to steer the "turn-off" current to the collector of the transistor and block it from the base after the transistor is turned off, so that in response to a subsequent applied "turn-on" voltage all of the current which flows in the base element flows across the base-emitter junction and therefore provides a high-speed "turn-on."

In accordance with another feature of the present invention an inductor means is provided in one leg of the current steering circuit which is connected to the collector of the transistor. The inductor means delays the current which is steered to the collector of the first stage thereby causing all of the first stage load current (which is the "turn-on" current of a transistor in a succeeding stage) to be composed only of the current which flows across the base-emitter junction of the second transistor. This feature aids in effecting the high speed "turn-on" of the succeeding stage and aids in the continuance of the minority carrier "clean-up."

The above mentioned and other features and objects of my invention will become more apparent by reference to the following description taken in conjunction with the accompanying drawing:

FIGURE 1 is a schematic diagram showing two switching circuit stages made up of the present logic building-block circuit.

The present building-block circuit has current steering means comprising two legs. The first leg includes diode D3 while the second leg includes diode D4 and the inductor, or choke, L.

During the steady state operation of the building-block circuit, current conducts through only one of the two legs of the current steering circuit. When the transistor is conducting in the steady state, current is flowing in the first leg from the +15 volt source 35, through resistor R3, through diode D3, and through diode D1. In addition, of course, base current is flowing from base 15, through resistor R2 and diode D1 (assuming capacitor C1 is fully charged). Obviously when the transistor is conducting it is the only time that the problem accompanying the "turn-off" need be considered. If a signal is applied to "turn-off" transistor 13, the "turn-off" current, which is the current that is supplied to neutralize the minority carriers in transistor 13, is supplied from the +15 volt source 35 through the first leg of the current steering circuit to the base of transistor 13. The "turn-off" current helps accelerate the turn-off time of the transistor as will be more fully appreciated hereinafter.

When the transistor 13 is turned-off in the steady state, current is conducting in the second leg from the +15 volt source 35, through resistor R3, through diode D4, through the inductor L, and through the resistor R4 to the −15 volt source 33. As the current conducts in the second leg, the bias at point 37 is sufficiently negative to back bias the diode D3 and block current from flowing through the first leg. Obviously when the transistor 13 is turned off it is the only time that the problem accompanying the "turn-on" need be considered. If the diode D3 is back-biased so that the first leg of the current steering circuit is electrically isolated from the base of the transistor, then all of the current which flows in the base circuit when the transistor is turned on will conduct across the emitter-base junction of transistor 13 and therefore the maximum efficiency related to "turn-on" speed is accomplished. It becomes clear that by virtue of the steering circuit the "turn-off" current is available to help speed up the turning-off of the transistor while this turn-off current is removed electrically from the scene thereby eliminating it as a hindrance to turning on the transistor.

Referring to FIGURE 1, it can be seen that the first logic building-block circuit 11 includes the transistor 13 which has a base element 15, an emitter element 17 and a collector element 19. It should be understood that although the description of the invention with respect to FIGURE 1 and throughout the specification deals with a common-emitter connected transistor it can be used with other modes of transistor connections by simply reversing the voltages and the diode polarities throughout, and thus the circuit may be connected with an NPN type transistor instead of the PNP transistor as shown.

Two input signal terminals 21 and 23 are shown in

FIGURE 1 which provide means for applying "turn-on" and "turn-off" signals to the first logic building-block circuit 11. Although two input signal circuits are shown, many input circuits might be used or as the case of the succeeding logic building-block 25 a single input signal means may be employed.

Consider first the operation of a single stage in particular the building-block circuit 11. Assume a steady state condition exists wherein a positive signal ("turn-off" signal of 0 volts) has been applied to terminal 21 and the transistor 13 is turned off. When the transistor 13 is turned off, the output voltage at the output line 29 is somewhat more negative than —3 volts. The output voltage, which is slightly more negative than —3 volts, appears on the output line 29 in response to current flow from the —3 volt source 31, through the diode D6 through the resistor R4 to the —15 volt potential source 33, and also from current flow from the +15 volt source 35, through the resistor R3, through the diode D4, through the inductor L, through resistor R4 to the—15 volt potential source 33. The combination of the current flow from the +15 volt source 35 and the current flow from the —3 volt source 31 provides a voltage at the output line 29 which is more negative than —3 volts (approximately —4 volts). With the voltage at point 37 approximating —3 volts, the diode D3 is back-biased and effectively out of the circuit since point 27 is approximately at 0 volts.

Consider now the steady state condition when transistor 13 is turned on, assuming that a negative pulse is being applied to terminal 21. The negative pulse applied to terminal 21 is at approximately —4 volts and therefore the voltage at point 27 approximates —3.5 volts. The transistor 13 has been turned on and is therefore conducting so that the potential at output line 29 is approximately ground or 0 volts. There will be current flowing from the +15 volt source 35, through the resistor R3, through the diode D3, through the diode D1 in response to the applied negative voltage. The point 37 will again approximate —3 volts in response to this last mentioned current flow and therefore the diode D4 will be back-biased since the output line 29 is at ground potential. In this way the second leg of the current steering circuit is electrically isolated from the building-block circuit.

While the transistor 13 is turned on the capacitor C1 is charged according to the polarities shown on the bottom portion of the plates of the illustrated capacitor C1. The capacitor C1 is a "speed-up" capacitor which enables the turn-off current to be directly applied to the base element 15, as will be discussed further hereinafter.

Consider now the turn-off sequence. The negative input pulse applied to terminal 21 rises to a positive level, i.e. to 0 potential level. At the instant that the input potential rises to 0 volts (ground potential) the point 27 will be at —3.5 volts because capacitor C1 has been charged to a voltage difference of approximately 3.5 volts which is now measured from the base. Instantaneously the capacitor C1 commences discharging through the resistor R2 loop. Further, current from the +15 volt source 35 will conduct, through R3, through D3 to provide the main discharge current for capacitor C1 through a loop including transistor 13, thereby providing current flow into the base element 15 to neutralize the stored minority carriers in the base of the transistor 13. In this way the charge which is developed by the stored minority carriers in the base will be neutralized and the transistor 13 will be turned off (i.e. no collector current will flow).

At the time that the transistor 13 is turned off the output line 29 assumes a potential which is slightly more negative than —3 volts and therefore the current which was being transmitted through the diode D3 will be steered through the diode D4 and through the inductor L into the output line 29.

Because the inductor L is present in the second leg of the steering circuit there will be a slight delay in the current flow from the +15 volt source 35 to the output line 29. This delay enables all of the "turn-on" current for transistor 39 of the second stage building-block 25, to be drawn across the emitter-base junction thereof, through the resistor R2' in parallel with the capacitor C1', through the diode D1' to the —15 volt source 33. In other words all the current which is supplied across the resistor R4 is in fact supplied by current conducting across the base-emitter junction of transistor 39 and in this way the transistor 39 is turned on rapidly. After the above described short delay, current does conduct through the inductor L and through the resistor R4 to the —15 volt potential source 33 thereby reducing the current flowing from the base of transistor 39. However, by this time the steady state conditions have been accomplished in the second building-block 25, and rapid "turn-on" has taken place.

The present circuit offers the advantage of having constant load current. When the transistor 13 is turned on, very little current (the current through R1') is drawn from the succeeding stage 25. However if a battery or a voltage source which could not be switched out of the circuit had been employed in stage 25 to provide the "turn-off" current for transistor 39 (instead of the steering circuit means through D3') a large current would flow into the first stage across the load R4 because the only impedance between the battery and the load would be the two diodes D3' and D1'. As additional stages might be added, the current drawn across the load R4 from the transistor 13 would vary, and hence the stored carriers and the effort to neutralize them would vary, thereby presenting variable delay of a stage. In such a case the maximum delay in "turn-off" obtained would be greater than the delay of a stage wherein the load current is constant.

The diode D5 is included in the basic building block 11 (as is D5' for circuit 25) in order to provide a safety means for the circuit in the event that neither the input terminals 21 nor 23 is connected to a signal source (i.e. open circuits). If the input terminals are open circuits, the diode D5 provides a circuit path for current flowing from the +15 volt source 36, and thereby prevents excessive current from being transmitted through the transistor 13 which would cause great damage thereto. The diode D5 may be connected as shown by the dashed line diode and lead. When the diode (D5) is connected on the cathode side of diode D2 it serves to dampen any ringing signal if the circuit is connected to another circuit by a lead constituting a transmission line (which may be as long as a few inches).

The voltage divider circuit which includes the resistors R1 and R2 is provided so that a slightly positive voltage (offset voltage) is applied to the base when the transistor is turned off. This positive offset voltage provides an insurance that noise signals, which find their way into the circuit, do not erroneously trigger transister 13.

The logic circuit shown by the block 41 is included to illustrate that more than one second stage building-block may be connected to the output line 29.

By way of example, satisfactory results have been experienced with the present circuit employing components having the following values: $R1=25K$ ohms, $R2=750$ ohms, $R3=2.5K$ ohms, $R4=250$ ohms, $L=5.6$ $\mu$h. and $C1=22$ $\mu\mu$f.

While I have described above the principles of my invention in connection with specific apparatus, it is to be clearly understood that this description is made only by way of example and not a limitation to the scope of my invention as set forth in the obects thereof and in the accompanying claims.

What is claimed is:

1. A logic building block circuit comprising:

(a) a transistor having an input element, an output element, and a control element;

(b) first biasing means coupled to said control element;

(c) input signal means coupled to said first biasing means;
(d) second biasing means adapted to be connected to a voltage source;
(e) first and second current path means common-connected to said second biasing means, said first current path means coupled to said first biasing means to conduct current from said second biasing means to said first biasing means in response to an input signal being applied to said input signal means and further conducting said last mentioned current through said first biasing means to said control element upon the termination of an input signal, said second current path means further coupled to said output element to conduct current from said second biasing means to said output element when said transistor is non-conducting;
(f) said first current path means functioning to provide turn-off current to said control element through said first biasing means in response to the termination of an input signal thereby neutralizing minority carriers in said transistor and hence accelerating turn-off;
(g) and said second current path means functioning to cause said turn-off current to be steered to said output element thereby developing a bias to block current flow in said first current path in the absence of an input signal being applied to said input signal means.

2. A logic building block circuit comprising:
(a) a transistor having an input element, an output element, and a control element;
(b) first biasing means coupled to said control element;
(c) input signal means coupled to said first biasing means;
(d) second biasing means adapted to be connected to a voltage source;
(e) inductor means connected to said output element;
(f) first and second current path means common-connected to said second biasing means, said first current path means coupled to said first biasing means to conduct current from said second biasing means to said first biasing means in response to an input signal being applied to said input signal means and further conducting said last mentioned current through said first biasing means to said control element upon the termination of an input signal, said second current path means coupled to said inductor means to conduct current from said second biasing means to said output element through said inductor means when said transistor is not conducting;
(g) said first current path means functioning to provide turn-off current to said control element through said first biasing means in response to the termination of an input signal thereby neutralizing minority carriers in said transistor and hence accelerating turn-off;
(h) and said second current path means functioning to cause said turn-off current to be steered to said output element by developing a bias to block current flow in said first current path in the absence of an input signal being applied to said input signal means.

3. A logic building block circuit comprising:
(a) a transistor having an input element, an output element, and a control element;
(b) first biasing means including a capacitor and a resistor connected in parallel and having one end thereof coupled to said control element;
(c) input signal means coupled to the other end of said first biasing means;
(d) second biasing means adapted to be connected to a voltage source;
(e) first and second current path means common-connected to said second biasing means, said first current path means coupled to said first biasing means to conduct current from said second biasing means to said first biasing means in response to an input signal being applied to said input signal means and further conducting said last-mentioned current through said first biasing means to said control element upon the termination of said input signal, and second current path means further coupled to said output element to conduct current from said second biasing means to said output element when said transistor is not conducting;
(f) said first current path means functioning to provide turn-off current to said control element through said first biasing means in response to the termination of an input signal thereby neutralizing minority carriers in said transistor, hence accelerating turn-off;
(g) and said second current path means functioning to cause said turn-off current to be steered to said output element thereby developing a bias to block current flow in said first current path in the absence of an input signal being applied to said input signal means.

4. A logic building block circuit comprising:
(a) a transistor having an input element, an output element, and a control element;
(b) first biasing means coupled to said control element;
(c) input signal means coupled to said first biasing means;
(d) second biasing means adapted to be connected to a voltage source;
(e) first and second current path means common-connected to said second biasing means, said first current path means coupled to said first biasing means and including a unidirectional current conducting device poled to conduct current from said second biasing means to said first biasing means in response to an input signal being applied to said input signal means and further conducting said last mentioned current through said first biasing means to said control element upon the termination of an input signal, said second current path means further coupled to said output element and including a unidirectional current conducting device poled to conduct current from said second biasing means to said output element when said transistor is non-conducting;
(f) said first current path means functioning to provide turn-off current to said control element through said first biasing means in response to the termination of an input signal thereby neutralizing minority carriers in said transistor and hence accelerating turn-off;
(g) and said second current path means functioning to cause said turn-off current to be steered to said output element thereby developing a bias to block current flow in said first current path in the absence of an input signal being applied to said input signal means.

5. A logic building block circuit acording to claim 4 wherein said second current path means includes an inductor means to delay a conduction of said turn-off current to said output element in order to prevent a succeeding building block to be turned off rapidly.

6. A logic building-block circuit comprising: a transistor having an input element, an output element, and a control element; first biasing means including a capacitor and a resistor connected in parallel having one end coupled to said control element; input signal means coupled to the other end of said first biasing means; current steering means having at least first and second current path means being common connected to second biasing means adapted to be connected to a voltage source; said first current path means connected to said first biasing means and including a first unidirectional current conducting device poled to conduct current from said second biasing means; said second current path means including a second unidirectional current conducting device poled to conduct current from said second biasing means and coupled to said output element; said first current path means functioning to provide turn-off current to said control element through said parallel connected capacitor and resistor in response to the termination of a turn-on signal applied to said input signal means to neutralize minority carriers in said transistor thereby accelerating turn-off; said second current path means causing said turn-off current to conduct to said output element in response to the absence of a turn-on signal being applied to said input signal means thereby developing a voltage to back-bias said first unidirectional current conducting device to block current flow in said first current path means, and said second current path means including an inductor means to delay the conduction of said turn-off current therethrough in order that a succeeding connected building-block circuit might have a rapid turn on.

7. A logic building-block circuit according to claim 6 wherein there is further included in said first biasing means a voltage divider means to provide a voltage offset to the base of said transistor in order that said transistor will not be erroneously turned on by noise.

8. A logic building-block circuit according to claim 6 wherein there is further included a clamping circuit connected to said first biasing means in order that said current through said first current path means can conduct through said clamp when said input signal means are an open circuit.

References Cited by the Examiner

UNITED STATES PATENTS

| | | | |
|---|---|---|---|
| 2,829,281 | 4/58 | Van Overbeek | 307—88.5 |
| 2,987,627 | 6/61 | Eckert | 307—88.5 |
| 3,149,239 | 9/64 | Weyging | 307—88.5 |

ARTHUR GAUSS, *Primary Examiner.*

JOHN W. HUCKERT, *Examiner.*